(12) United States Patent
Zahn

(10) Patent No.: US 6,555,800 B1
(45) Date of Patent: Apr. 29, 2003

(54) PROCESS AND APPARATUS FOR THE INDUCTION HARDENING OF CRANKSHAFTS

(75) Inventor: Andreas Zahn, Riegel (DE)

(73) Assignee: Maschinenfabrik Alfing Kessler GmbH, Aalen (DE)

( * ) Notice: Subject to any disclaimer, the term of this patent is extended or adjusted under 35 U.S.C. 154(b) by 26 days.

(21) Appl. No.: 09/685,358

(22) Filed: Oct. 10, 2000

(30) Foreign Application Priority Data

May 19, 2000 (DE) .......................... 100 24 990

(51) Int. Cl.[7] .............. H05B 6/10; H05B 6/40
(52) U.S. Cl. .............. 219/639; 219/652; 219/672; 148/572; 266/129
(58) Field of Search ................. 219/639, 640, 219/641, 635, 652, 672; 148/572, 573, 567; 266/129

(56) References Cited

U.S. PATENT DOCUMENTS 4,123,644 A * 10/1978 Sorenson ............... 219/639

6,013,904 A 1/2000 Storm et al.
6,160,248 A * 12/2000 Ottenwaelder et al. ..... 219/639

FOREIGN PATENT DOCUMENTS

DE 4029724 C2 8/1992
GB 822544 3/1956

* cited by examiner

Primary Examiner—Philip H. Leung
(74) Attorney, Agent, or Firm—Lee, Mann, Smith, McWilliams, Sweeney & Ohlson

(57) ABSTRACT

In a process for the induction hardening of crankshafts with at least one connecting-rod pin and with at least two main bearings, in particular for the hardening of the at least one connecting-rod pin, by means of a contactlessly operating inductor, the crankshaft performs a rotational movement during the hardening of the at least one connecting-rod pin. The center axis of the at least one connecting-rod pin to be hardened is used as the axis for the rotational movement of the crankshaft.

20 Claims, 6 Drawing Sheets

PROCESS AND APPARATUS FOR THE INDUCTION HARDENING OF CRANKSHAFTS

The invention relates to a process for the induction hardening of crankshafts with at least one connecting-rod pin and with at least two main bearings, in particular for the hardening of the at least one connecting-rod pin, by means of a contactlessly operating inductor, the crankshaft performing a rotational movement during the hardening of the at least one connecting-rod pin. Furthermore, the invention relates to an apparatus for carrying out the process.

A process of the generic type is known from U.S. Pat. No. 6,013,904. In this case, the crankshaft is clamped at both its ends and rotated at a certain, but in itself variable speed. In order in this process to harden not only the main bearings but also the connecting-rod pins, the inductor is arranged on a handling device which continuously follows the rotational movement of the connecting-rod pin. As a result, contactless hardening of the crankshaft is possible, which is intended to lead to a shorter working time overall in the hardening of the crankshaft.

However, such constant tracking by the inductor is very complicated and is susceptible to wear and faults. The possible occurrence of runouts, in other words inaccuracies of the workpiece, can still cause undesired contact of the workpiece with the tool. Furthermore, a very complicated control system is required for the constant tracking by the inductor. Finally, the process described above And the associated apparatus make very high demands on the operating personnel, which inevitably leads to higher wage costs and consequently workpiece costs.

A similar state of the art is also shown by DE 40 29 724 C2, it being intended here, in contrast with U.S. Pat. No. 6,013,904, that the coupling distance between the tool and the workpiece be set such that it is smaller at subregions of the surface of the workpiece which have a high heat dissipation than at subregions of the surface of the workpiece which have a low heat dissipation. This is intended to achieve a homogeneous hardness profile within a fast cycle, i.e. in a short time.

However, this apparatus and the associated process have similar disadvantages to those already stated above.

It is therefore the object of the present invention to provide a process and an apparatus for the induction hardening of the connecting-rod pins of crankshafts by means of which contactless hardening is possible with comparatively little effort. At the same time, as little tool wear as possible and simple operator control are to be provided.

This object is achieved according to the invention by the center axis of the at least one connecting-rod pin to be hardened being used as the axis for the rotational movement of the crankshaft.

By using the center axis of the at least one connecting-rod pin to be hardened as the axis for the rotational movement of the crankshaft, i.e. by shifting the center axis of the connecting-rod pin toward the rotational axis of the crankshaft, the region of the crankshaft that is respectively to be hardened, in the present case the connecting-rod pin, no longer performs an eccentric movement about a point but a purely rotational movement about its center axis or, in other words, a movement that is coaxial-concentric to the rotational center axis. For this reason, the inductor no longer has to track the connecting-rod pin to be hardened, but can remain in one and the same place during the entire hardening operation for the individual connecting-rod pin. This makes the process very much easier to control, since constant tracking movements are not necessary, and there is advantageously the combined effect that easier control is possible and the movement of the mechanical parts is reduced to a minimum.

Furthermore, this results in a relatively simple and consequently easy-to-operate and fault-insusceptible process, which leads to low wear of the inductor and consequently also to low downtimes when carrying out the process. According to the invention, contactless hardening of the crankshaft is now possible, which in addition to lower wear of the inductor leads to shorter heating times and consequently makes it possible to achieve a gain in cycle time and is also accompanied by smaller heat inflow zones. The rotation during hardening advantageously leads to a very homogeneous hardening zone. The relatively great extent to which the inductor wraps around the connecting-rod pin in this case creates a clearance in the coupling dimension, in other words the distance between the crankshaft and the inductor. This allows compensation for a possibly occurring circularity runout of the crankshaft within certain limits.

The process according to the invention may be advantageously carried out in a wide variety of ways and with a wide variety of degrees of automation, which leads to very great flexibility in the hardening of crankshafts.

When hardening crankshafts with a plurality of connecting-rod pins arranged offset in relation to one another, it may be provided in a particularly advantageous embodiment of the invention that, for hardening the second connecting-rod pin, arranged offset in relation to the first connecting-rod pin, the crankshaft is pivoted by an angle corresponding to the angle between the first connecting-rod pin and the second connecting-rod pin. Since the angles referred to between the connecting-rod pins are always known, very high precision is possible here, leading to a good hardening result. It goes without saying that this procedure may also be transferred from the second connecting-rod pin to the third connecting-rod pin and generally in each case to the next-following connecting-rod pin.

If the crankshaft to be hardened has a plurality of connecting-rod pins in line with one another, it may be advantageous on the one hand to harden them by means of one inductor, the inductor then having to be transported over a corresponding distance in the axial direction after the hardening of one connecting-rod pin. As an alternative to this, it is also possible to harden a plurality of connecting-rod pins in line with one another simultaneously by means of a corresponding number of inductors. Depending on the configuration of the crankshaft to be hardened and on the possibility dependent on this of providing inductors, one of the two possibilities mentioned will be more advantageous.

To achieve a heat distribution that is as uniform as possible within the overall heated region of the crankshaft, it may be provided in a further advantageous embodiment of the invention that the power of the inductor is changed in a way corresponding to the geometrical shape of the crankshaft web adjoining the connecting-rod pin to be hardened.

An apparatus for carrying out the process is provided by the features of claim 8.

The at least one inductor, the rotating device and the adjusting device according to the invention provide an apparatus which, compared with already known hardening apparatuses for crankshafts, is of a simple and consequently easy-to-operate construction and in which only little maintenance effort is required on account of, inter alia, the contactless hardening operation.

A very great amount of heat is introduced into the region of the crankshaft to be hardened if, in an advantageous embodiment of the apparatus according to the invention, the inductor encloses the connecting-rod pin to be hardened at least over half its circumference.

A configuration of the inductor that is very simple and inexpensive to produce can be provided by the at least one inductor being produced by machine production.

In a further advantageous refinement of the invention, a pivoting device which is capable of pivoting the crankshaft by a certain angle about its center axis may be provided.

An a result, in the case of crankshafts with connecting-rod pins arranged offset in relation to one another, it is possible in a very simple way to pivot the connecting-rod pin respectively to be hardened into the rotational axis of the hardening apparatus.

Further advantageous refinements and developments of the invention are provided by the remaining subclaims and by the exemplary embodiment presented in principle below on the basis of the drawing, in which:

Figure 1:
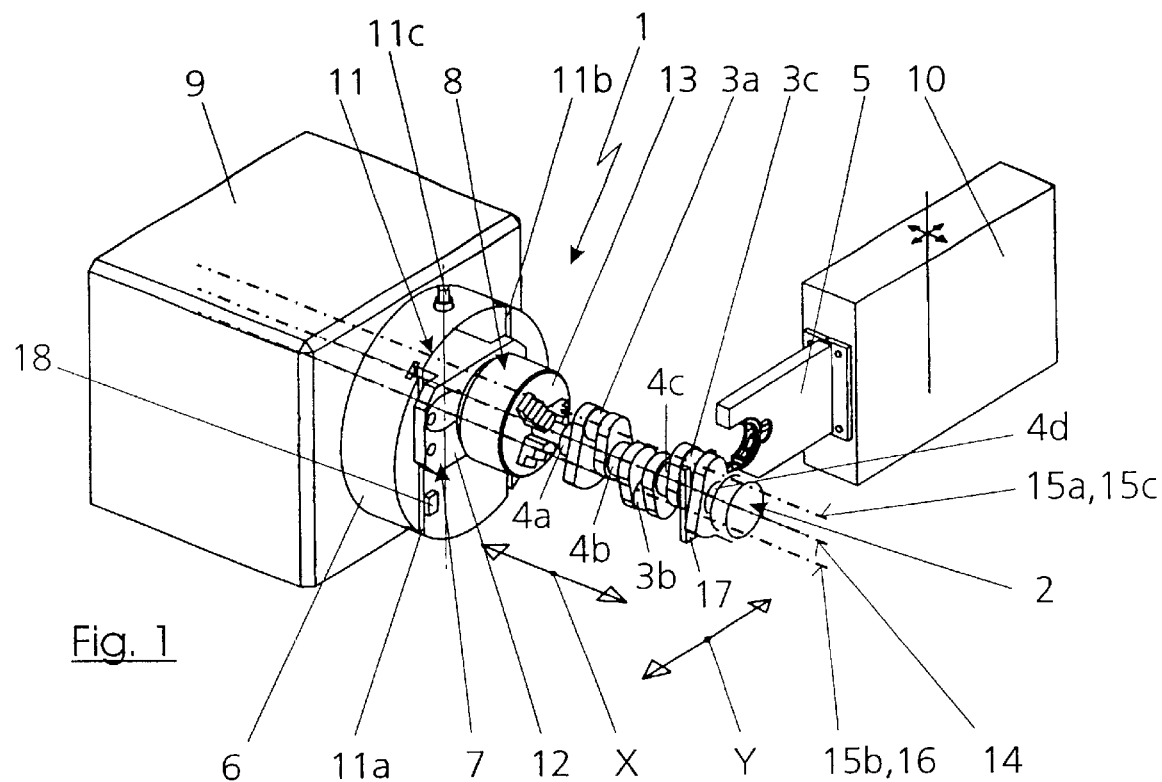
FIG. 1 shows a perspective view of a first embodiment of the apparatus according to the invention for carrying out the process for the induction hardening of crankshafts.

FIG. 1 shows in a perspective representation an apparatus 1 for the induction hardening of a crankshaft 2 with, in the present case, three connecting-rod pins 3, namely the connecting-rod pins 3a, 3b and 3c, as well as with four main bearings 4, to be precise the main bearings 4a, 4b, 4c and 4d. In all the process steps described below, only the connecting-rod pins 3a, 3b and 3c of the crankshaft 2 are hardened, it being possible however for the main bearings 4a, 4b, 4c and 4d of the crankshaft 2 likewise to be hardened by means of the apparatus 1, which however is not described in any more detail.

It goes without saying that the hardening of crankshafts 2 with less than or more than three connecting-rod pins 3 is also possible with the apparatus 1, it being possible in a very simple way for person skilled in the art also to apply the process described below to such crankshafts 2. The crankshaft 2 presented here is to be regarded only by way of example and does not necessarily correspond to a crankshaft 2 actually used in internal combustion engines.

The apparatus 1 has an inductor 5, a rotating device 6, an adjusting device 7, a pivoting device 8, a basic body 9 and a transformer 10 for the inductor 5. The inductor 5 is arranged on a transporting device (not represented). The purpose and operating mode of these individual elements of the apparatus 1 are described in more detail below, but the basic principle of induction hardening of the crankshaft 2 is not dealt with, since this is already sufficiently known from the prior art described at the beginning. In principle, this involves briefly inducing an eddy current in the surface zone of the region to be hardened of the crankshaft 2 by means of high-frequency voltages. As a result, the region to be hardened heats up very quickly at the surface to a certain hardening temperature. Subsequently, the region it hardened by quenching with a coolant.

On the rotating device 6 attached to the basic body 9 and designed in the form of a receiving chuck is a guideway 11, which has two grooves 11a and 11b running parallel to one another. Displaceably mounted on the guideway 11 is a carriage 12, which together with the guideway 11 forms the adjusting device 7 described at the beginning. The carriage 12 may be adjusted along the guideway 11, for example by means of a crank (not represented), which acts on a square 11c. It goes without saying that other possibilities for transporting the carriage 12 are also conceivable, for example by means of NC- or CNC-controlled [sic] drive devices, which may for example be electrically driven.

Mounted on the carriage 12 is a clamping means designed as a jaw chuck 13, which is designed in a way known per se and represents part of the pivoting device 8 designed in this embodiment an a mechanical sub-apparatus. The crankshaft 2 is clamped in the jaw chuck 13, so that it is connected via the jaw chuck 13 to the adjusting device 7 and, as a result, also to the rotating device 6. In this way, the crankshaft 2 can be rotated by driving the rotating device 6. It goes without saying that, instead of the jaw chuck 13 represented, any other suitable clamping means could also be used, such as pivoting tensioners for example.

Figure 2:
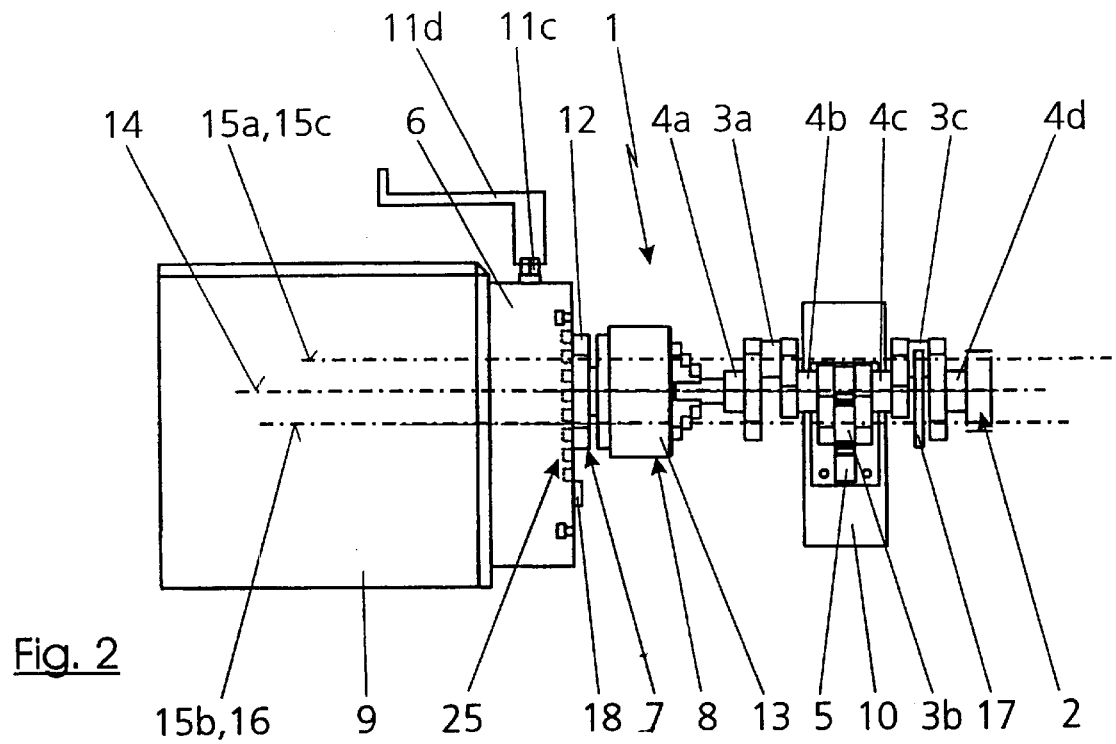
FIG. 2 shows a side view of the apparatus from FIG. 1.
Figure 3:
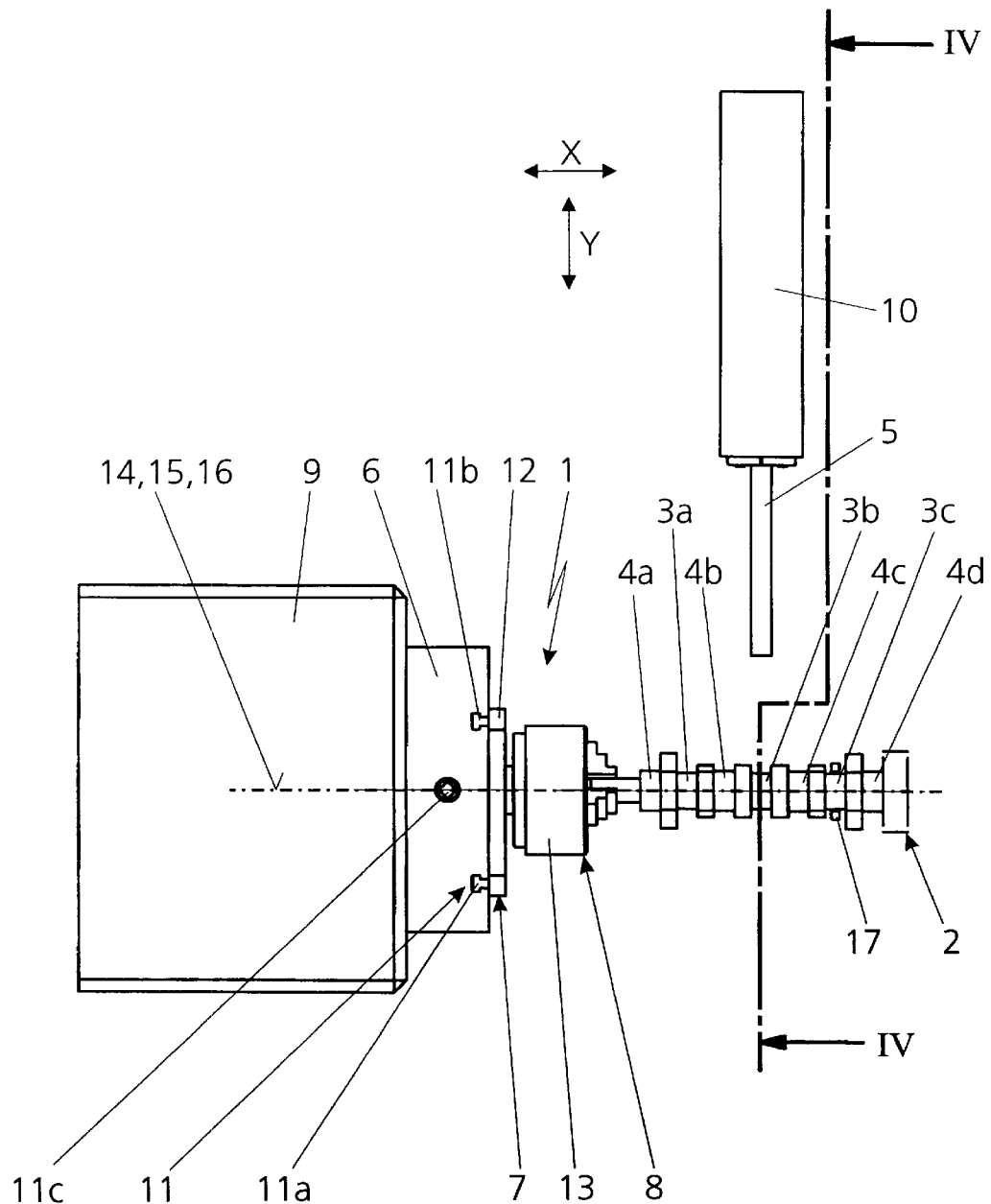
FIG. 3 shows a plan view of the apparatus from FIG. 1.

Before explaining the process for hardening the crankshaft 2, firstly certain geometrical aspects of the crankshaft 2 are explained: the crankshaft 2 has a center axis 14 running through the main bearings 4, and a plurality of center axes 15a, 15b and 15c running through the respective connecting-rod pins 3a, 3b and 3c. These center axes 15a, 15b and 15c have a certain distance, the same for each individual center axis 15a, 15b and 15c, from the center axis 14, corresponding to the so-called stroke of the crankshaft 2. The described geometrical aspects of the crankshaft 2 can also be followed better in FIG. 2.

To be able to harden the main bearings 4 of the crankshaft 2 in a way not represented, the center axis 14 of the crankshaft 2 running through the main bearings 4 is set in line with the center axis 16 of the rotating device 6 and the crankshaft is rotated by means of the rotating device 6. Then the advancing of the inductor 5 takes place with the aid of the transporting device, the possible transporting paths of which are indicated by arrows X and Y. It is possible here for the inductor 5 to be transported along the center axis 14 of the crankshaft 2, which corresponds to the arrow denoted by X. The advancing movement, in other words the movement perpendicular to the center axis 14 in the direction of the crankshaft 2, is indicated by the arrow Y.

In order to fix the exact position of the connecting-rod pin 3 when the crankshaft 2 is clamped into the jaw chuck 13, or to fix this position after clamping in has taken place, a fork-like receiving and adjusting element 17 is provided. Generally, the fork-like element 17 receives one of the connecting-rod pins 3, whereupon the jaw chuck 13 is clamped. In the present case, the connecting-rod pin 3c is received; it goes without saying that the fork-like element 17 could also receive one of the other connecting-rod pins 3a or 3b. If the position of the crankshaft 2 within the jaw chuck 13 is known from the position of the connecting-rod pins 3, the method described below can be adopted.

For hardening one of the connecting-rod pins 3, for example as provided according to FIG. 1 to FIG. 7 the connecting-rod pin 3b, the adjusting device 7 is set such that the center axis 15b of the connecting-rod pin 3b is exactly in line with the center axis 16 of the rotating device 6 or is identical to the same. For this purpose, in the embodiment described, the carriage 12 is adjusted by the distance between the center axis 14 and the center axes 15a, 15b and 15c. Consequently, the respective center axis 15 of the connecting-rod pin 3 respectively to be hardened can be used as the axis for the rotational movement of the crankshaft 2, in other words in the present case the center axis 15b of the connecting-rod pin 3b to be hardened.

During the hardening operation, which is carried out by means of the inductor 5 enclosing the connecting-rod pin 3b to be hardened approximately over half its circumference, all the main bearings 4, the jaw chuck 13 and the carriage 12 then rotate with variable speed about the center axis 15b of the connecting-rod pin 3b to be hardened in this case, which is located in the axis of the rotational movement of the crankshaft 2. As described above, the inductor 5 is brought up. to the connecting-rod pin 3b in the direction of the arrow Y, but is kept at a certain distance from the same, the so-called coupling dimension. A contactless hardening of the connecting-rod pin 3b, in which the operations briefly described above proceed, then takes place.

It goes without saying that the use of one and the same inductor 5 for the main bearings 4 and the connecting-rod pins 3 is to be regarded only by way of example and can be used only in very theoretical applications, since in most cases separate inductors are probably necessary. However, the basic movement of the respective inductors corresponds to one another, so that in this way a very good explanation of the operations according to the process is possible. For the main bearings 4, there could be provided in addition to the inductors 5 for the connecting-rod pins 3 one or more further inductors (not represented) with associated transporting devices. In this way, the crankshaft 2 could be hardened in the finished form in one setup.

In addition to hardening the outer cylindrical surfaces of the respective connecting-rod pin 3, transitional radii with respect to the crank webs of the crankshaft 2 can also be hardened by means of the inductor 5.

Furthermore, it may be advantageous with respect to the heat distribution within the cross section of the crankshaft 2 to change the power of the inductor 5 in a way corresponding to the geometrical shape of the crank web adjoining the connecting-rod pin 3 respectively to be hardened. This power distribution would be adapted to the mass distribution in the cross section of the crankshaft 2, i.e. where there is a greater mass, a higher power would be required.

The plan view according to FIG. 3 reveals once again in more detail the construction of the crankshaft 2 with the connecting-rod pins 3 and the main bearings 4. The possible movements of the inductor 5 are also clearly represented once again in this figure by means of the arrows X and Y.

Figure 4:
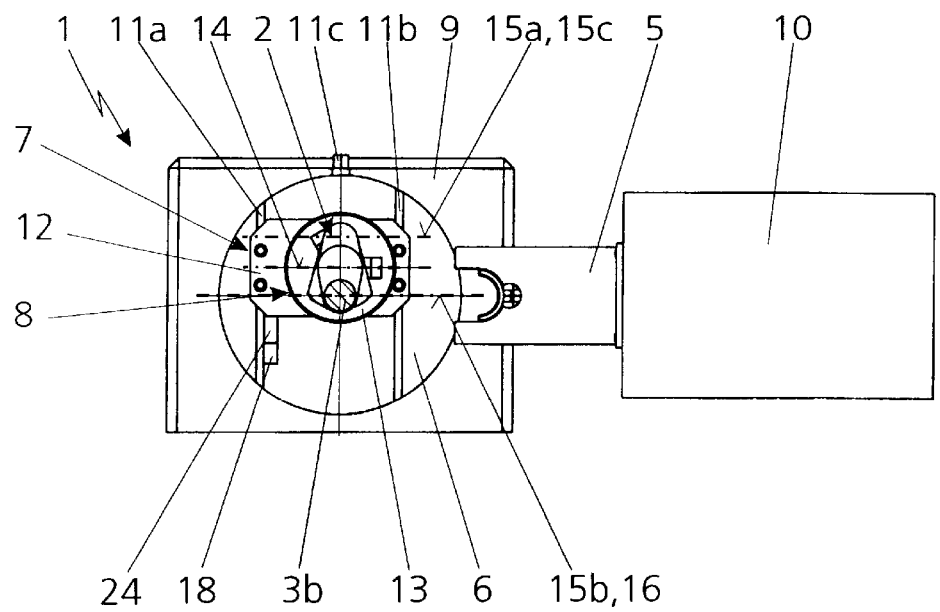
FIG. 4 shows a section along the line IV—IV from FIG. 3.

In the section according to FIG. 4, which runs through the connecting-rod pin 3c to be hardened, the distance, corresponding to the stroke of the crankshaft 2, between the center axis 14 of the main bearings 4 and the center axes 16 and 15b of the rotating device and the connecting-rod pin 3b, respectively, which of course are in line with one another or lie one on top of the other, can be seen.

Figure 5:
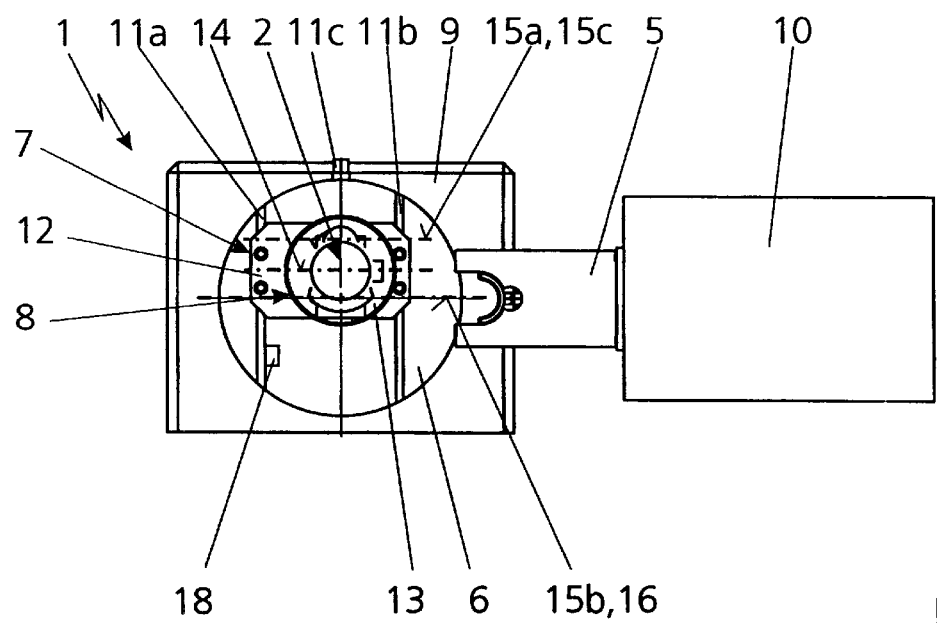
FIG. 5 shows a front view of the apparatus from FIG. 1.

The front view according to FIG. 5 shows a very similar representation, although here the connecting-rod pin 3c to be hardened is concealed.

Figure 8:
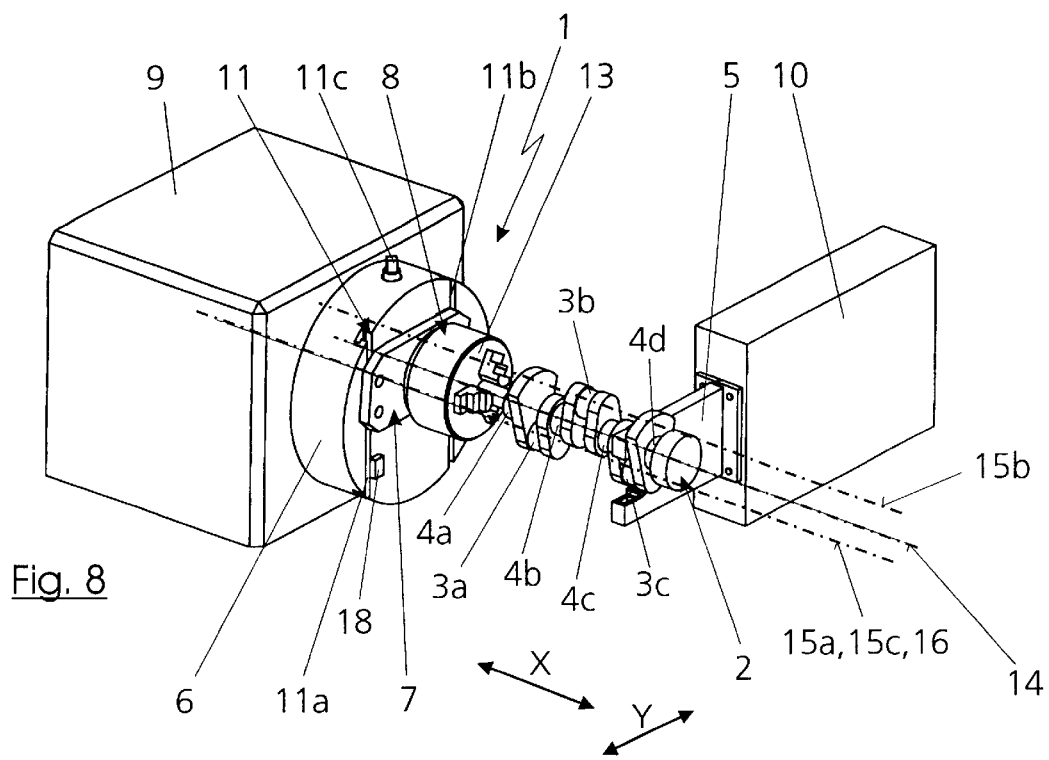
FIG. 8 shows a perspective view of the apparatus from FIG. 1 and FIG. 6, in which the inductor is in engagement with another connecting-rod pin.

In order to harden the next connecting-rod pin, for example as represented in FIG. 8 the outer connecting-rod pin 3c, after the hardening operation of the connecting-rod pin 3b the pivoting device 8 is merely pivoted by the angle in the direction of rotation, in other words the cross-staggering angle, between the connecting-rod pin 3b just hardened and the connecting-rod pin 3c to be hardened next.

This is realized in the present exemplary embodiment by turning the jaw chuck 13, for example by hand. For this purpose, a latching is provided for the jaw chuck 13, so that operating errors are ruled out even when turning by hand. The center axis 15c of the connecting-rod pin 3c is then in line with the center axis 16 of the rotating device 6 and the connecting-rod pin 3c can consequently be hardened by means of the inductor 5 in the same way as the connecting-rod pin 3b before. For this purpose, the inductor 5 is merely transported with the aid of the transporting device along the center axis 16 according to the arrow X, whereupon the advancing movement in the direction of the connecting-rod pin 3c, in other words in the direction of the arrow Y. takes place. Both said movements of the transporting device may take place for example under NC or CNC control [sic]. During the transporting movement of the inductor 5, the pivoting movement of the crankshaft 2 described above may also take place at the same time. Theoretically, it is also conceivable in each case to transport the crankshaft 2 instead of the inductor 5 in the direction of the arrow X.

In the present case, which, as already mentioned above, only occurs theoretically, a plurality of connecting-rod pins 3 in line with one another, namely the connecting-rod pin 3c and the connecting-rod pin 3a, can be hardened by means of the one inductor 5, It is appropriate for the connecting-rod pins 3a and 3c to be hardened one after the other, since their center axes 15a and 15c are identical and, as a result, pivoting of the crankshaft 2 is not necessary. Alternatively, it goes without saying that it would also be possible to harden the connecting-rod pins 3a and 3c in line with one another simultaneously by means of a corresponding number of inductors 5 (not represented here however), in order in this way to achieve a certain time saving with slightly greater expenditure on apparatus. Depending on the number and respective arrangement of the connecting-rod pins 3, a wide variety of configurations are conceivable here.

The dimension required for setting the center axes 15 of the connecting-rod pins 3 as the axis for the rotation of the crankshaft 2 may be formed, for example, by a gage block, by the length of which the adjusting device 7, i.e. in the present came the carriage 12, is then adjusted along the guideway 11. In a way not represented, this gage block may be placed for example against a stop 16 attached to the rotating device 6, whereupon the adjustment of the carriage 12 takes place until it bears against the gage block. Alternatively, it goes without saying that it is also conceivable to provide a latching 25 schematically shown in FIG. 2 for the carriage 12 along the guideway 11 for various dimensions for setting the center axes 15 to the center axis 16. In this way, frequently recurring stroke dimensions of various crankshafts 2 could be preset. The NC or CNC control [sic] already mentioned above would be suitable for example for such a case.

Figure 6:
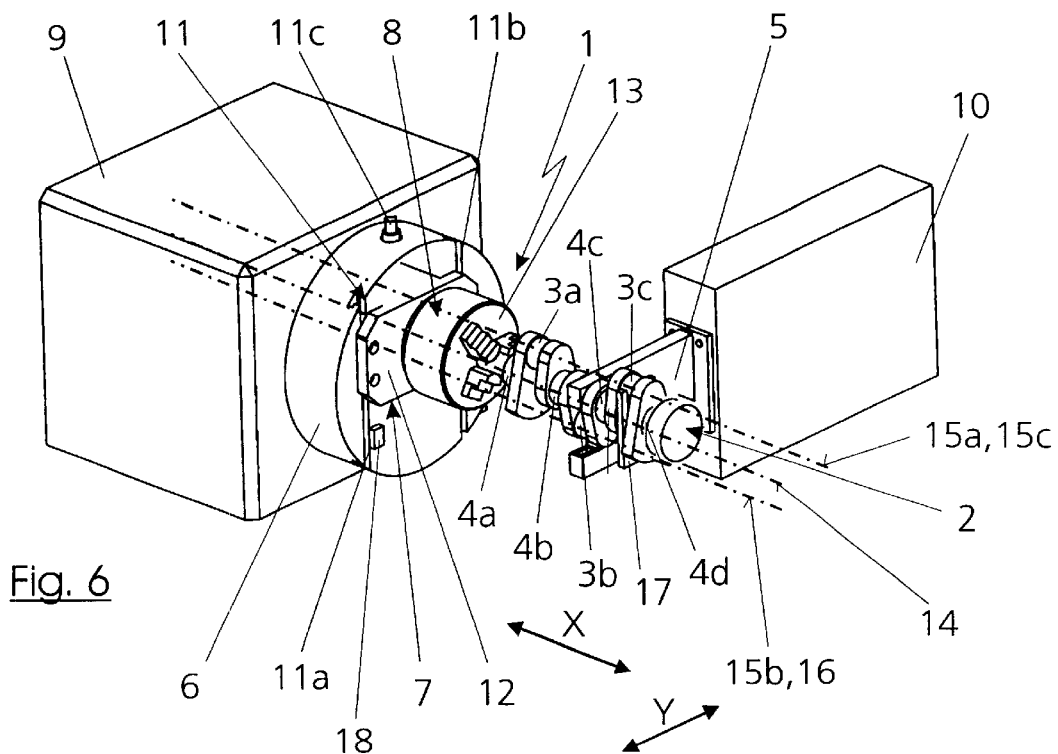
FIG. 6 shows a perspective view of the apparatus from FIG. 1, in which the inductor is in engagement with a connecting-rod pin.
Figure 7:
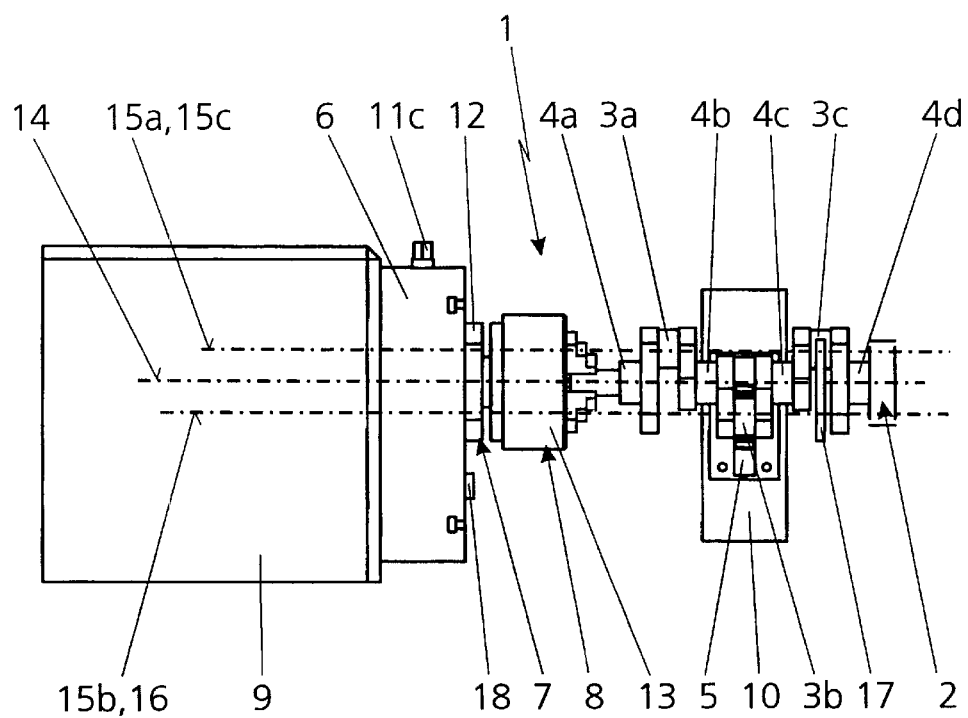
FIG. 7 shows a side view of the apparatus from FIG. 6.

FIG. 6 and FIG. 7 show the crankshaft already represented in FIG. 2 to FIG. 5, although the inductor 5 is in engagement with the connecting-rod pin 3b. The construction of the apparatus and the described way in which the process is carried out for hardening the connecting-rod pins 3 of the crankshaft 2 make it possible to use inductors 5 which are of a very simple construction and can be produced by machine production, for example by turning and milling. This simple production of the inductors 5 enhances accuracy and consequently reproducibility, which has a bearing in particular when changing the inductors 5.

In principle, inductors 5 which comprise two half-shells, and consequently enclose better the region to be hardened of the crankshaft 2, can also be used.

Figure 9:
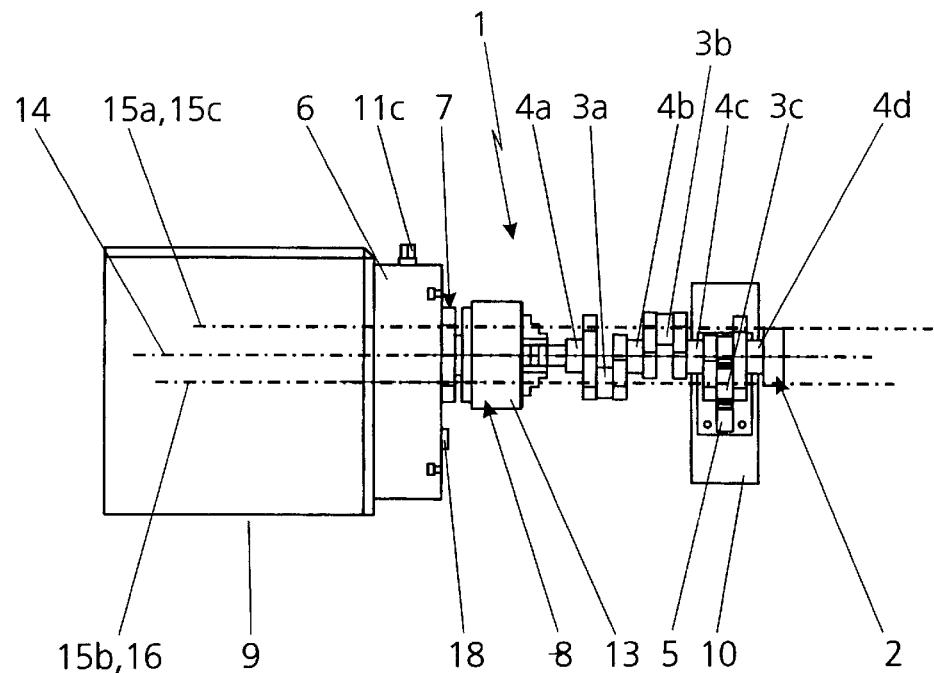
FIG. 9 shows a side view of the apparatus from FIG. 8.

In the case of the apparatus 1 according to FIG. 8 and FIG. 9, the inductor 5 assumes a position in which the connecting-rod pin 3c is hardened. In this case too, a drive device (not represented), which is for example electrically operated, could be provided for the adjusting device 7.

Figure 10:
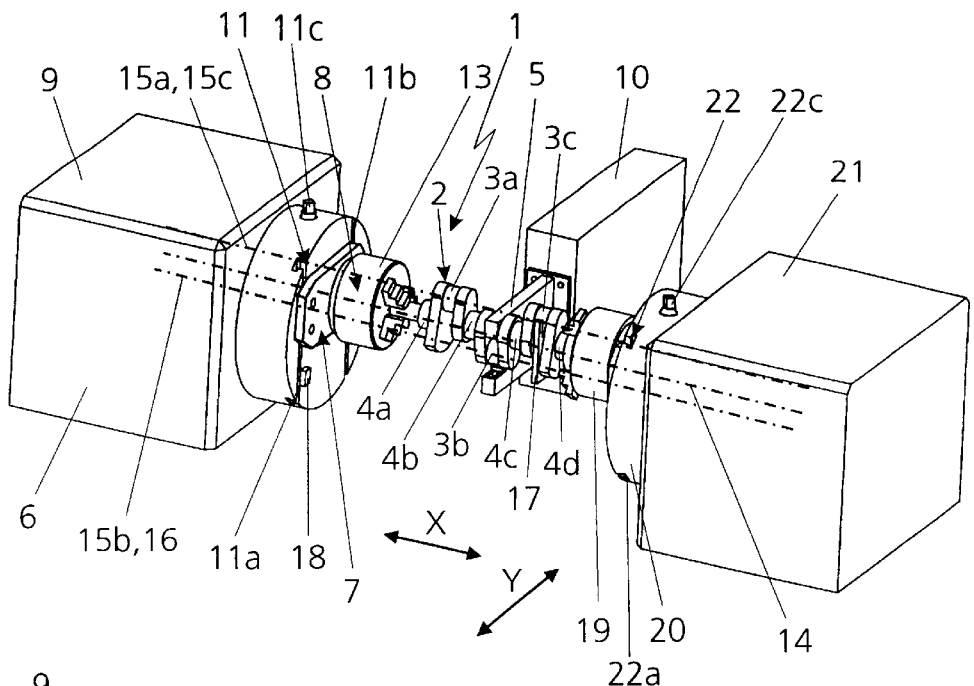
FIG. 10 shows a perspective view of a third embodiment of the apparatus according to the invention for carrying out the process for the induction hardening of connecting-rod pins of crankshafts.

FIG. 10 shows the apparatus 1 from FIG. 8, although the connecting-rod pin 3b is being hardened and, what is more, the crankshaft 2 is hold on its side opposite the jaw chuck 13 in a further clamping means, which in likewise designed as a jaw chuck 19 and is mounted on a further basic body 21 by means of a further adjusting device (not represented) and a rotating device 20 corresponding to the rotating device 6. This construction is suitable for the apparatus 1, since cantilevered holding of the crankshaft 2 is likely to lead to major runout problems. The second basic body 21 with the second jaw chuck 19 has been omitted from FIGS. 1 to 9 for reasons of overall clarity.

The coupling of the rotation may in principle take place directly via the crankshaft 2 or via an additional shaft (not represented). Alternatively, it is theoretically also possible to drive the crankshaft 2 at both ends, very good coordination between the two movements then being required. The adjustment of the axes described above should in each case take place separately at both ends of the crankshaft 2, for which purpose, an already mentioned above, there is likewise provided on the side of the second jaw chuck 19 an adjusting device with a guideway 22, of which only a groove 22a and a square 22c are represented. For pivoting the crankshaft 2, one of the jaw chucks 13 or 19 is slightly opened, the crankshaft 2 being held at its opened end by a centering point (not represented). This is followed by the pivoting and subsequently by the clamping of the slightly opened jaw chuck 13 or 19.

Figure 11:
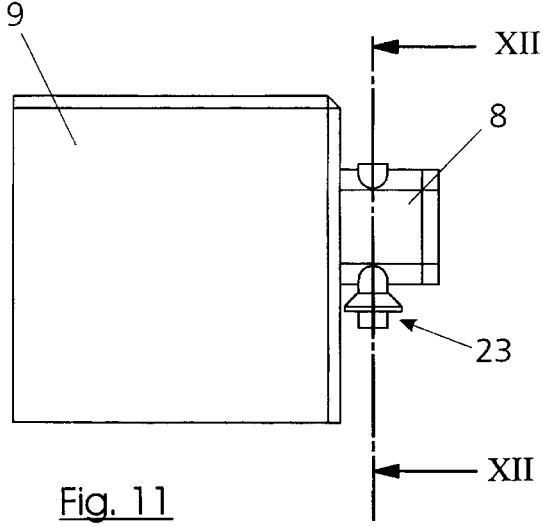
FIG. 11 shows a pivoting device for the apparatus according to the invention in a configuration as a worm drive.
Figure 12:
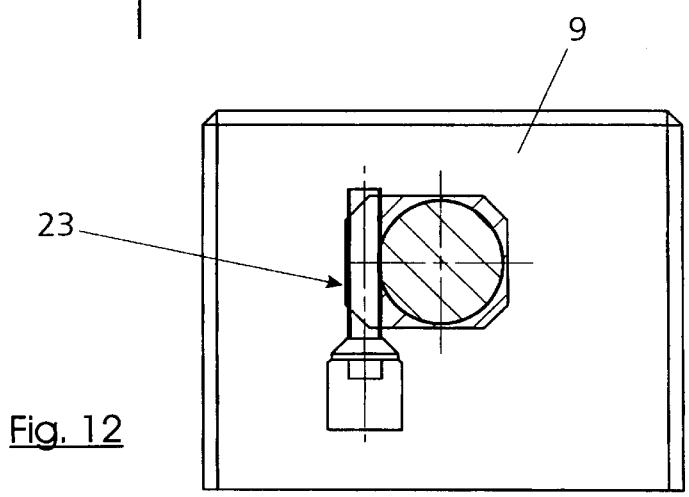
FIG. 12 shows a section along the line XII—XII from FIG. 11.

Furthermore, FIGS. 11 and 12 reveal a worm drive 23, which is part of the pivoting device 8 and may be, for example, hydraulically or electrically driven. This worm drive 23 makes it possible to dispense with manual operation of the pivoting device 8. If appropriate, one of the configurations of hand corresponding [sic] latching (not represented) is also conceivable for the worm drive 23.

The process described above can not only be applied to the crankshafts 2 represented but also be used in the case of crankshafts 2 of the split-pin type. In this case, hardening is carried out by means of two inductors 5 simultaneously, in a way not represented, in the region between a crank web of connecting-rod pins 3 lying directly next to one another. The center axis of one of the connecting-rod pins 3 to be hardened is then used as the axis for the rotational movement of the crankshaft 2 and the other inductor 5 is made to track the further connecting-rod pin 3, just a very small eccentricity having to be overcome however.

Should the crankshaft 2 to be hardened have a circularity runout, it goes without saying that use of a supporting stay (not represented) in a central region of the crankshaft 2 is also possible. The supporting stay should in this case act as far as possible against a connecting-rod pin 3 which has the same center axis 15 as the connecting-rod pin 3 to be hardened at this moment, or directly against the connecting-rod pin 3 to be hardened. It is similarly conceivable to use suitable measures to move the clamping means 13 or 19 locally closer to the connecting-rod pin 3 to be hardened, which in suitable for example in the case of pivoting tensioners. As mentioned above, the greater extent of wrap and the resultant greater selectable coupling dimension can counteract the risk of contact between the inductor 5 and the crankshaft 2 possibly occurring due to the circularity runout.

In principle, the connecting-rod pins 3 and the main bearings 4 can be hardened in a single apparatus 1 if the inductors 5 necessary for this can be accommodated. However, it is usually suitable to harden the connecting-rod pins 3, which are mechanically more complicated to harden, and the main bearings 4, which are mechanically easier to harden, in separate apparatuses, it then being possible for these to be interconnected in a modular manner. This then leads to a reduction in the cycle time.

What is claimed is:

1. A process for induction hardening at least one connecting-rod pin formed on a crankshaft by means of a contactlessly operating inductor, the crankshaft having the at least one connecting-rod pin and at least two main bearings, comprising the step of: performing a rotational movement of the crankshaft during the hardening of a first one of the at least one connecting-rod pin, the first one of the at least one connecting-rod pin having a central axis, the central axis of the first of the at least one-connecting-rod pin being hardened being used as an axis for the rotational movement of the crankshaft.

2. The process according to claim 1 for hardening a second connecting-rod pin of the crankshaft which is arranged offset in relation to the first one of the at least one connecting-rod pin, including the further step of pivoting the crankshaft by an angle corresponding to the angle between the first one of the at least one connecting-rod pin and the second connecting-rod pin.

3. The process according to claim 1, wherein the at least one connecting-rod pin includes a plurality of connecting-rod pins which are in line with one another and are hardened by means of one inductor.

4. The process according to claim 1, wherein the at least one connecting-rod pin includes a plurality of connecting-rod pins which are in line with one another and are hardened simultaneously be means of a corresponding number of inductors.

5. The process according to claim 1, wherein transitional radii with respect to a crank web portion of the crankshaft are hardened in addition to outer cylindrical surfaces of the respective connecting-rod pin.

6. The process according to claim 5, wherein the power of the inductor is changed in a way corresponding to a geometrical shape of the crank web portion adjoining the connecting-rod pin respectively to be hardened.

7. The process according to claim 1, wherein the crankshaft is a split-pin type, and a plurality of connecting-rod pins lying directly next to one another are hardened simultaneously by means of two inductors, the central axis of one of the connecting-rod pins to be hardened being used as the axis for rotational movement of the crankshaft, and one of the inductors being made to track the one connecting-rod pin.

8. An apparatus for induction hardening of at least one connecting-rod pin of a crankshaft, said connecting pin having a central axis, comprising:
   at least one inductor adapted to be disposed adjacent to the at least one connecting-rod pin to be hardened;
   at least one rotating device for rotating the crankshaft; and
   at least one adjusting device associated with the at least one rotating device and which receives the crankshaft and sets the central axis of one of the at least one connecting-rod pin of the crankshaft as an axis for the rotational movement of the crankshaft.

9. The apparatus according to claim 8, wherein the at least one inductor encloses the at least one connecting-rod pin to be hardened at least over half the circumference of the at least one connecting-rod pin.

10. The apparatus according to claim 8, wherein the at least one inductor is produced by machine production.

11. The apparatus according to claim 8, including at least one pivoting device which is capable of pivoting the crankshaft by a certain angle about its central axis.

12. The apparatus according to claim 11, wherein the at least one pivoting device has a mechanical worm drive.

13. The apparatus according to claim 12, wherein the worm drive is hydraulically driven.

14. The apparatus according to claim 12, wherein the worm drive is electrically driven.

15. The apparatus according to claim 11, wherein the at least one pivoting device has a clamp to receive the crankshaft.

16. The apparatus according to claim 8, wherein the at least one adjusting device has a carriage which can be adjusted along a guideway disposed perpendicular to the central axis of the crankshaft.

17. The apparatus according to claim 16, wherein the carriage is adapted to be adjusted along the guideway by means of a crank.

18. The apparatus according to claim 8, wherein the dimension required for setting the central axis of the connecting-rod pin to be hardened of the crankshaft as the axis for the rotation of the crankshaft is formed by a gage block, adapted to adjust the length of the adjusting device.

19. The apparatus according to claim 8, wherein a latching is provided for various dimensions for setting the central axis of the connecting-rod pin to be hardened of the crankshaft as the axis for the rotation of the crankshaft.

20. The apparatus according to claim 8, including a fork-like receiving and adjusting element, which receives one of the connecting-rod pins, and provides for aligning the crankshaft before hardening.

* * * * *